United States Patent [19]

Gerdes

[11] 4,036,399
[45] July 19, 1977

[54] GAS CAP WITH AUTOMATIC PRESSURE COMPENSATION

[75] Inventor: Theodor Gerdes, Langenfeld, Germany

[73] Assignee: Blau KG Fabrik fur Kraftfahrzeugteile, Langenfeld, Germany

[21] Appl. No.: 719,413

[22] Filed: Sept. 1, 1976

[30] Foreign Application Priority Data

Sept. 4, 1975 Germany .............................. 2539320

[51] Int. Cl.² .................... B65D 51/16; B65D 45/00; B65D 83/10
[52] U.S. Cl. .......................... 220/303; 220/DIG. 32; 220/316; 220/231; 220/367; 220/204
[58] Field of Search ............... 220/203, 206, 208, 367, 220/DIG. 32, DIG. 33, 204, 369, 303

[56] References Cited

U.S. PATENT DOCUMENTS

| | | | |
|---|---|---|---|
| 2,463,516 | 3/1949 | Burkhardt | 220/367 X |
| 3,809,282 | 5/1974 | Blau et al. | 220/DIG. 33 X |
| 3,974,936 | 8/1976 | Gerdes | 220/DIG. 32 X |

Primary Examiner—William Price
Assistant Examiner—Steven M. Pollard
Attorney, Agent, or Firm—Michael J. Striker

[57] ABSTRACT

A gas tank cap has an inner part connectable to a gas tank filler pipe and an outer part biased outwardly away from the inner part by a spring and normally freely rotatable relative to the inner part. One or more passages in the cap communicate with the filler pipe and with the ambient atmosphere and have valves interposed in them which are so positioned that when the outer part is pushed towards the inner part the valves are automatically opened to vent pressure from the gas tank. Only after the valves have opened in response to pushing of the outer part towards the inner part do the two parts become coupled for subsequent joint rotation so as to permit removal of the gas cap from the filler pipe.

11 Claims, 4 Drawing Figures

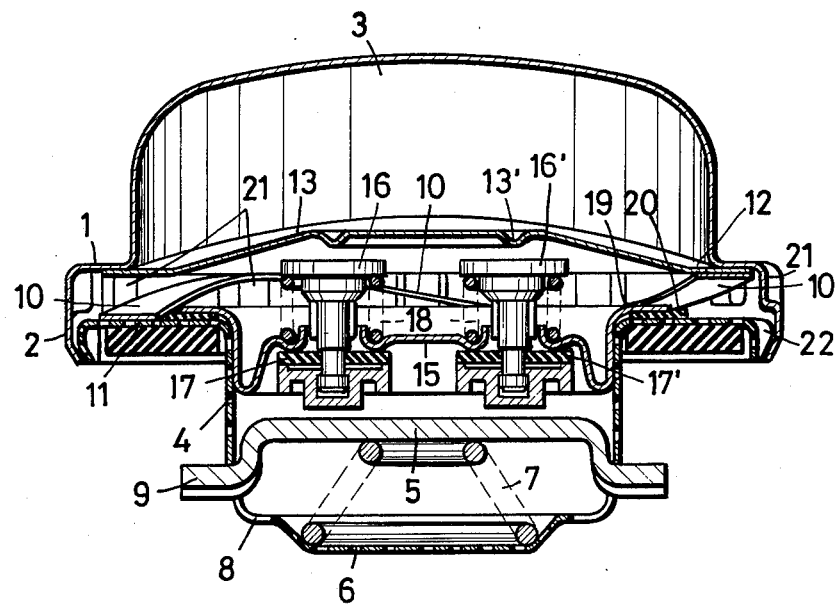
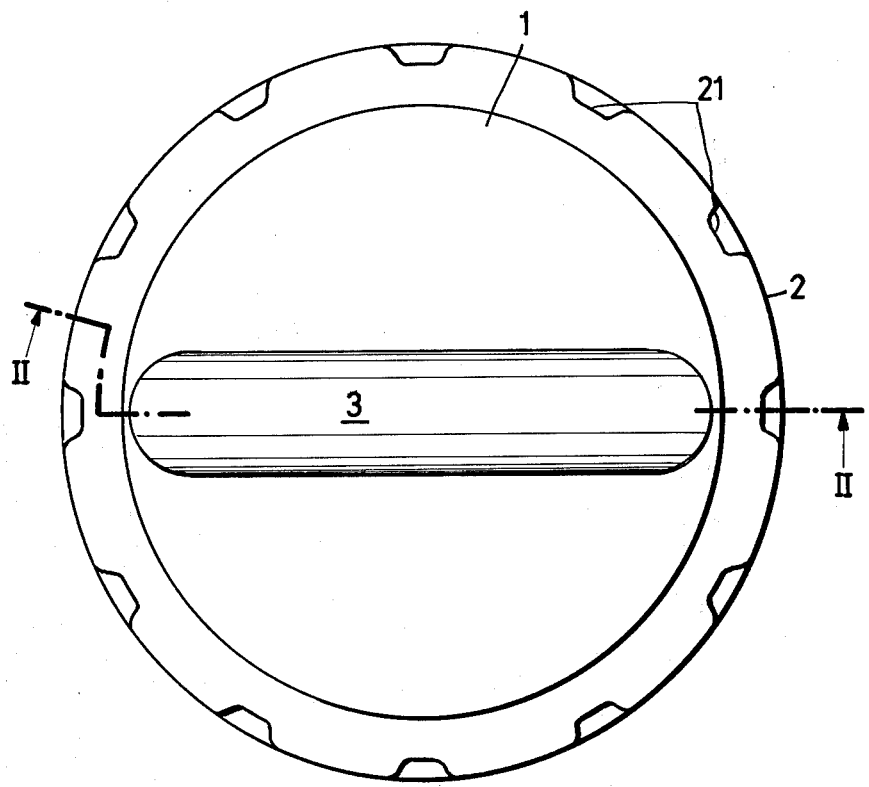

GAS CAP WITH AUTOMATIC PRESSURE COMPENSATION

BACKGROUND OF THE INVENTION

This invention relates to a gas cap with automatic pressure compensation.

Prior art gas caps which are used to close the filler pipe on gas tanks of automotive vehicles and the like usually provide for some type of pressure compensation in order to vent excess pressure from the interior of the tank. However, these devices are all rather complicated and despite this do not operate fully satisfactorily. Accordingly, further improvements in this field are desirable.

SUMMARY OF THE INVENTION

It is therefore a general object of this invention to avoid the disadvantages of the prior art.

More particularly, it is an object of the invention to provide a bayonet-type gas cap which is very simple in its construction and easy to use.

Another object of the invention is to provide a gas cap of the type in question which is reliable and which offers improved operating characteristics.

An additional object of the invention is to provide a gas cap of the type mentioned above which cannot be opened until internal overpressure in the tank has been dissipated.

In keeping with these objects and others which will become apparent hereafter, a feature of the invention resides in the provision of a novel gas cap having an outer part which is mounted so as to be spaced from an inner part and to be freely rotatable relative to the latter, being normally biased away from the inner part. A pressure compensating valve is provided, having a plunger which is moved in a sense opening the valve when the outer part of the cap is pushed inwardly, thereby effecting automatic venting of overpressure from the tank. Only after this valve has been so opened will the outer part become coupled with the inner part for joint rotation therewith in a sense permitting removal of the cap from the filler pipe.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top plan view of a gas cap according to the invention;

FIG. 2 is a vertical section taken on line II—II of FIG. 1;

DESCRIPTION OF THE PREFERRED EMBODIMENTS

Figure 3:
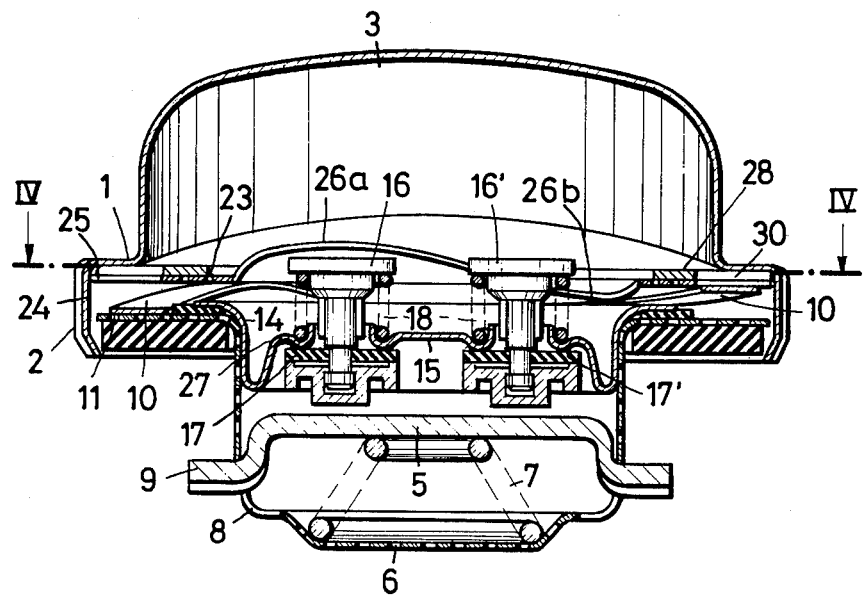
FIG. 3 is a view similar to FIG. 2 but illustrating a further embodiment of the invention.

A first embodiment of the invention is illustrated in FIGS. 1 and 2. The gas cap in these FIGURES has a cupped outer part 1 formed with an outwardly bulging portion 3 which serves as a handle and with a profiled circumferential flange 2. Reference numeral 4 identifies an inner part which is also cupped and provided with a bridging portion 5 which extends diametrally of the part 4 and has end portions 9 which constitute part of a bayonet closure and which project through cutouts 8 provided at opposite sides of the part 4 in the circumferential wall of the latter. A spring 7 biases the part 5 upwardly and bears against the bottom wall of the part 4.

The upper part 1 and the inner part 4 are normally maintained out of engagement with one another by a biasing force. In the illustrated embodiment this biasing force is furnished by a corrugated leaf spring 10 which bears against a flange 11 of the part 4 extending circumferentially of the same and acting axially of the cap in a sense urging the parts 1 and 4 axially apart. The spring 10 engages a horizontal surface 12 of an annular part 13 which is fixedly connected — e.g., by welding or a unitary construction — with the periphery of the part 1 and has a horizontal surface 12 which is contacted by the spring. Due to this construction the part 1 is maintained axially spaced from the part 4 due to the biasing force of the spring 10 and is freely turnable relative to the part 4.

Located within the circumferential wall of the part 4 is a component 15 which is shaped as illustrated at 14 and which overlaps the upper end of the part 4 and is provided with vent holes in each of which respective pressure venting valves 16, 16' are received. The valves 16, 16' have valve seals 17, 17' which normally close the vent holes in component 15 under the influence of biasing springs 18. The component 15 has a flange 19 which overlaps the flange 11 of the part 4, a sealing ring 20 being interposed between them; the flange 19 is located within the circumferential confines of the outer periphery of the annular leaf spring 10.

The member 13 closes the interior of the part 1 and is formed at the center of its upwardly bowed middle portion with an annular depression 13'. When the part 1 is pushed inwardly — i.e., downwardly in FIG. 2 — the annular bead formed at the underside of the member 13 by the provision of the depression 13' presses against the valves 16, 16' in a sense causing the valve seals 17, 17' to move out of engagement with the respective valve seats, thereby opening the valves and permitting pressure from the interior of a tank on which the gas cap is installed to escape to the exterior. At this time it is impossible to remove the gas cap from the tank because the outer part 1 will still turn freely relative to the part 4. Only further inward pressing of the outer part 1 beyond the point at which the valves 16, 16' open will cause circumferentially distributed projections 21 on the periphery of part 1 to enter into correspondingly dimensioned recesses 22 formed at the circumference of the flange 11 of the part 4. The entry of the projections 21 into the recesses 22 now couples the parts 1 and 4 mechanically so that they are jointly rotatable whereby turning of the part 1 by means of the handle 3 results in disengagement of the bayonet closure from the cooperating parts (not shown) of the filler pipe to permit removal of the gas cap.

It is clear that the present invention makes it impossible to remove the gas cap without first automatically causing an equalization of pressure between the interior of the tank and the ambient atmosphere thus eliminating a source of danger.

In place of the two valves 16, 16' a single larger dimensioned valve could be used and the member 13 could be provided with an appropriately shaped bead which engages the valve to open it. The separate handle 3 could be eliminated and, for example, the outer surface of the part 1 could be knurled. The bowed member 13 could be replaced with a planar member and provided with a center opening having an upset boundary which could press against the single or dual valves to open the same.

Figure 4:
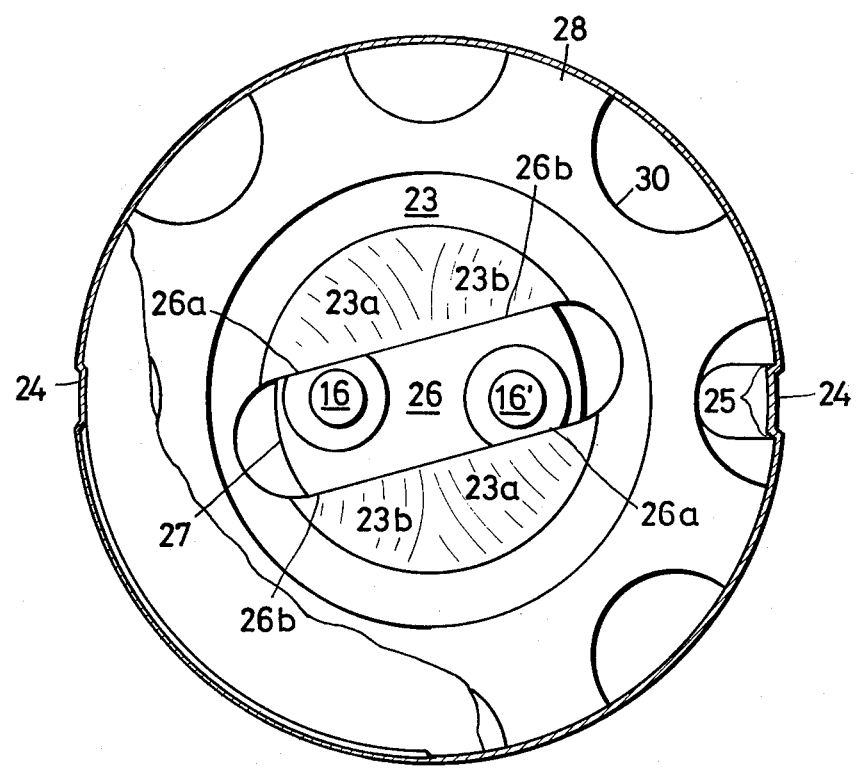
FIG. 4 is a section taken on line IV—IV of FIG. 3.

In the embodiment of FIGS. 3 and 4 the components corresponding to those in FIGS. 1 and 2 have been identified with the same reference numerals. In this embodiment the part 1 has an inset portion 23 which extends at the locations 25 into engagement with inwardly extending projections 24 formed in the peripheral flange of the part 1. The inset portion 23 is formed with downwardly bowed depressions 23a and 23b and with a diametrally extending elongated cutout 26. The edge portions bounding the cutout 26 are identified with reference numerals 26a and 26b and, as shown in FIG. 4, are corrugated so as to be alternately bowed downwardly and upwardly. They are so positioned that when the part 1 is axially depressed (i.e., pushed downwardly in FIG. 3) the edge portions 26a will push the valves 16 and 16' to open position, passing the valve seals 17, 17' to move off their respective valve seats.

When the outer part 1 is turned in counterclockwise direction after it has been depressed sufficiently to open the valves 16, 16', the flanks of the portions 26b slide on the valve members of the valves 16, 16' and maintain the valves in open condition. At the same time the parts 1 and 4 become coupled for joint rotation so that the gas cap can now be removed. In this embodiment the member 13 is again provided with the shaped portion 27 (see FIG. 3) which is visible in FIG. 4 below the cutout 26. Reference numeral 28 identifies a member having a large diameter center opening 29 and circumferentially distributed peripheral recesses 30.

The embodiment in FIGS. 3 and 4 can be modified in the manner described with respect in FIGS. 1 and 2. Merely for the sake of completeness it is pointed out that evidently in both embodiments an automatic compensation for underpressure — i.e., partial vacuum in the tank — can take place since in such a case the partial vacuum will be effective to cause the valve seals 17, 17' to lift inwardly off their associated valve seats.

It will be understood that each of the elements described above, or two or more together, may also find a useful application in other types of devices differing from the types described above.

While the invention has been illustrated and described as embodied in a cap for gas tanks and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A gas cap, particularly for filler pipes of motor vehicles, comprising an inner part having bayonet- portions for engagement with corresponding portions of a filler pipe; an outer part mounted on said inner part freely rotatable relative thereto; biasing means biasing said parts away from one another so as to maintain them at a predetermined distance; passage means in said parts in communication with the ambient atmosphere and adapted to communicate with the interior of a filler pipe; valve means normally closing said passage means; valve actuating means on said outer part and operative to open said valve means when said outer part is displaced to a first position towards said inner part counter to said biasing means; and coupling means for coupling said parts together for joint rotation only when said outer part is displaced toward said inner part past said first poritlon to a second position.

2. A gas cap as defined in claim 1, wherein said parts have respective coacting circumferential faces, said biasing means comprising an annular corrugated leaf spring interposed between and reacting against said faces.

3. A gas cap as defined in claim 2; further comprising a disk-shaped member having a circumferential edge portion interposed between said leaf spring and one of said faces.

4. A gas cap as defined in claim 3, said outer part having a hollow interior and said disk-shaped member spanning said interior and having a center portion which is bowed in direction inwardly of said interior, said center portion having a surface facing said inner part and provided with a projection; and wherein said valve means comprises at least one valve positioned to be engaged and opened by said projection in response to movement of said outer part to said first position thereof.

5. A gas cap as defined in claim 4, wherein said projection is annular and said valve means comprises two separate valves.

6. A gas cap as defined in claim 3, said outer part having a hollow interior and said disk-shaped member spanning said interior and having a hole, said disk-shaped member further having an inner circumferential edge portion bounding said hole and upset so as to project towards said inner part, and wherein said valve means comprises at least one valve positioned to be engaged and opened by said inner edge portion in response to movement of said outer part to said dirst position thereof.

7. A gas cap as defined in claim 1, said outer part having an inner surface directed towards said inner part and provided with a projection, and said valve means comprising at least one valve positioned to be engaged and opened by said projection in response to movement of said outer part to said first position thereof.

8. A gas cap as defined in claim 7, wherein said valve means comprises two separate valves, and said projection is annular and has circumferentially spaced portions each engageable with one of said valves.

9. A gas cap as defined in claim 1; further comprising a member extending across said outer part intermediate the same and said inner part and having outer peripheral portions; and wherein said outer part is provided at diametrally opposite outer circumferential locations with engaging portions which engage and retain said outer peripheral portions.

10. A gas cap as defined in claim 9, wherein said member is provided with bulges projecting from opposite surfaces of said member, and a diametral slot bounded by corrugated edge portions.

11. A gas cap as defined in claim 1, wherein said outer and inner parts have respective outer peripheries, and wherein said coupling means comprises mating coupling portions on said peripheries and engageable with one another only in response to movement of said outer part beyond said first and to said second position.

* * * * *